US009239963B2

(12) United States Patent
Irie (10) Patent No.: US 9,239,963 B2
(45) Date of Patent: Jan. 19, 2016

(54) IMAGE PROCESSING DEVICE AND METHOD FOR COMPARING FEATURE QUANTITIES OF AN OBJECT IN IMAGES

(71) Applicant: OMRON Corporation, Kyoto-Shi (JP)

(72) Inventor: Atsushi Irie, Nara (JP)

(73) Assignee: OMRON CORPORATION, Kyoto-shi (JP)

( * ) Notice: Subject to any disclaimer, the term of this patent is extended or adjusted under 35 U.S.C. 154(b) by 3 days.

(21) Appl. No.: 14/219,525

(22) Filed: Mar. 19, 2014

(65) Prior Publication Data

US 2014/0301650 A1    Oct. 9, 2014

(30) Foreign Application Priority Data

Apr. 8, 2013   (JP) .................................. 2013-080565

(51) Int. Cl.
G06K 9/62 (2006.01)
G06K 9/46 (2006.01)
G06K 9/00 (2006.01)

(52) U.S. Cl.
CPC .......... *G06K 9/4604* (2013.01); *G06K 9/00281* (2013.01); *G06K 9/6211* (2013.01)

(58) Field of Classification Search
None
See application file for complete search history.

(56) References Cited

U.S. PATENT DOCUMENTS

2009/0220156 A1*  9/2009  Ito et al. .................... 382/201
2012/0288167 A1* 11/2012  Sun et al. ................... 382/118
2014/0169680 A1*  6/2014  Tang .......................... 382/197
2014/0328543 A1* 11/2014  Iwamoto et al. ........... 382/201

FOREIGN PATENT DOCUMENTS

JP        2009-528117 A    8/2009
WO       2008/072140 A2    6/2008

* cited by examiner

*Primary Examiner* — Brian P Werner
(74) *Attorney, Agent, or Firm* — Nutter McClennen & Fish LLP; John J. Penny, Jr.

(57) ABSTRACT

An image processing device comprises a part-point specifying unit configured to specify a part point of an object; a feature-quantity extracting unit configured to extract one or a plurality of feature quantities from a pixel of a sampling point or from a pixel group including the pixel of the sampling point, for each of a plurality of sampling points, and extract candidate feature quantities corresponding to the part point constituted by the extracted plurality of feature quantities corresponding to the respective sampling points, the plurality of sampling points comprising the part point specified by the part-point specifying unit and at least one point on the image other than the part point; and a feature-quantity generating unit configured to generate one or a plurality of comparison feature quantities corresponding to the part points based on a predetermined standard by using the candidate feature quantities extracted by the feature-quantity extracting unit.

8 Claims, 5 Drawing Sheets

SAMPLING POINT

PART POINT

FIG. 3

Ex) Sobel filter

| -2 | -1 | -1 |
|---|---|---|
| 0 | 0 | 0 |
| 2 | 1 | 1 |

| -1 | -2 | -1 |
|---|---|---|
| 0 | 0 | 0 |
| 1 | 2 | 1 |

| -1 | -1 | 2 |
|---|---|---|
| 0 | 0 | 0 |
| 1 | 1 | 2 |

Ex) Haar-like filter

FIG. 4

REGISTERED IMAGE

COMPARISON FEATURE
QUANTITY: 88

INPUT IMAGE

COMPARISON FEATURE
QUANTITY: 85

REGISTERED IMAGE

FEATURE QUANTITY: 30

INPUT IMAGE

FEATURE QUANTITY: 75

Prior Art

IMAGE PROCESSING DEVICE AND METHOD FOR COMPARING FEATURE QUANTITIES OF AN OBJECT IN IMAGES

CROSS-REFERENCE TO RELATED APPLICATION(S)

This application claims the benefit of priority from Japanese Patent Application No. 2013-080565, filed on 8 Apr. 2013, the entire contents of which is incorporated herein by reference for all purposes.

BACKGROUND

The present invention relates to an image processing device, an image processing method, and a recording medium for executing authentication of an object, or estimating an attribute or a state of the object, by comparing comparison feature quantities of a part point of the object on an image between a registered image and an input image.

Conventionally, there are face authentication techniques for authenticating an individual person based on a registered facial image. According to a general face authentication technique, first, a subject to be authenticated is photographed, and a face is detected from the photographed image. Next, a part point (a contour point of an inner corner of an eye, an outer corner of an eye, or a mouth) of an organ (eyes, nose, mouth, or the like) of the detected face is specified. Then, an individual person is authenticated, by comparing between a feature quantity of the specified part point in the photographed image (the input image) and a feature quantity of the specified part point in the registered image.

Figure 6:
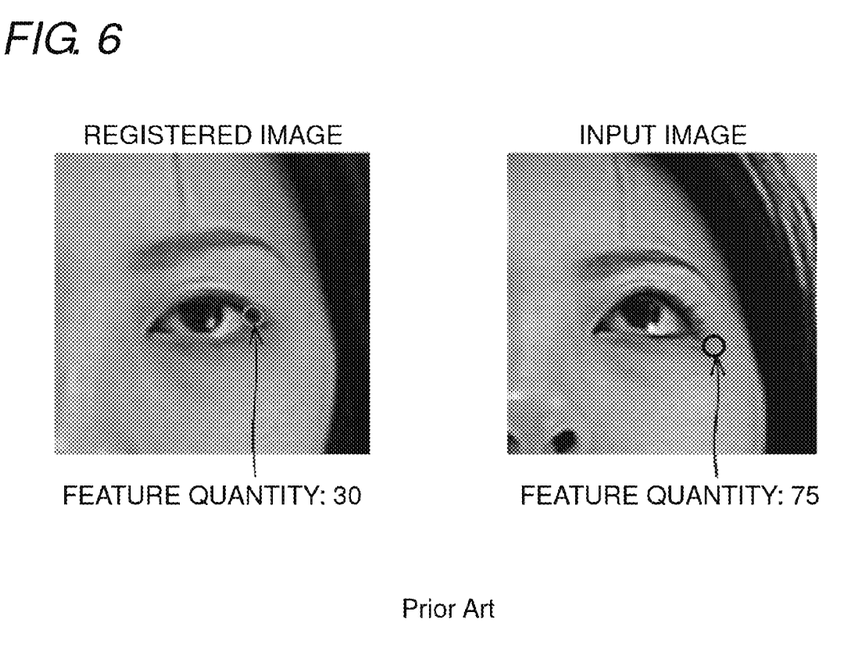
FIG. 6 shows an example of a feature quantity extracted from a certain part point in a registered image and an input image according to a conventional technique.

However, since precision of the techniques of specifying a part point is not 100% in some cases, a part point cannot be specified at a correct position. Specifically, while part-point specifying techniques in general can precisely specify a part point of a front facial image and the like, a position of a part point is deviated in some cases, depending on the person, expression of the face, a direction of the face, illumination, or accessory (such as glasses). That is, a part point detected from a registered image and a part point detected from an input image specified are respectively deviated from correct positions in some cases. Accordingly, as shown in FIG. 6, although photographed images are of the same person, a feature quantity of the left corner of the eye in the registered image and a feature quantity of the left corner of the eye in the input image are greatly different in some cases. In this case, since a feature quantity extracted from the input image is different from a feature quantity in the registered image, an authentication device decides that this is not the same person. That is, there is a problem that the authentication is not correctly executed.

The present invention has been made in view of the above problem. An object of the invention is to realize an image processing device, an image processing method, and a recording medium for stably executing precise authentication, even when a part point specified is deviated from a correct position.

SUMMARY

According to at least one embodiment of the present invention, there is an image processing device for comparing comparison feature quantities of a part point of an object on an image between a registered image and an input image, and executing authentication of the object or executes estimate of an attribute or a state of the object, the image processing device comprising a part-point specifying unit that specifies a part point of the object, a feature-quantity extracting unit that extracts one or a plurality of feature quantities from a pixel of a sampling point or from a pixel group including the pixel of the sampling point, for each of a plurality of sampling points, and extracts candidate feature quantities corresponding to the part point constituted by the extracted plurality of feature quantities corresponding to the respective sampling points, the plurality of sampling points comprising the part point specified by the part-point specifying unit and at least one point on the image other than the part point, and a feature quantity specifying unit that specifies one or a plurality of comparison feature quantities corresponding to the part point based on a predetermined standard by using the candidate feature quantities extracted by the feature-quantity extracting unit.

According to at least one embodiment of the present invention, there is an image processing method for comparing comparison feature quantities of a part point of an object on an image, between a registered image and an input image, and executing authentication of the object or executing estimate of an attribute or a state of the object, the image processing method comprising a part-point specifying step of specifying a part point of the object, a feature-quantity extracting step of extracting one or a plurality of feature quantities from a pixel of a sampling point or from a pixel group including the pixel of the sampling point, for each of a plurality of sampling points, and extracting candidate feature quantities corresponding to the part point constituted by the extracted plurality of feature quantities corresponding to the respective sampling points, the plurality of sampling points comprising the part point specified by the part-point specifying unit and at least one point on the image other than the part point, and a feature quantity specifying step of specifying one or a plurality of comparison feature quantities corresponding to the part point based on a predetermined standard by using the candidate feature quantities extracted in the feature-quantity extracting step.

DETAILED DESCRIPTION

An embodiment of the present invention is described below with reference to FIG. 1 to FIG. 5.

[Configuration of Image Authentication Device]

Figure 1:
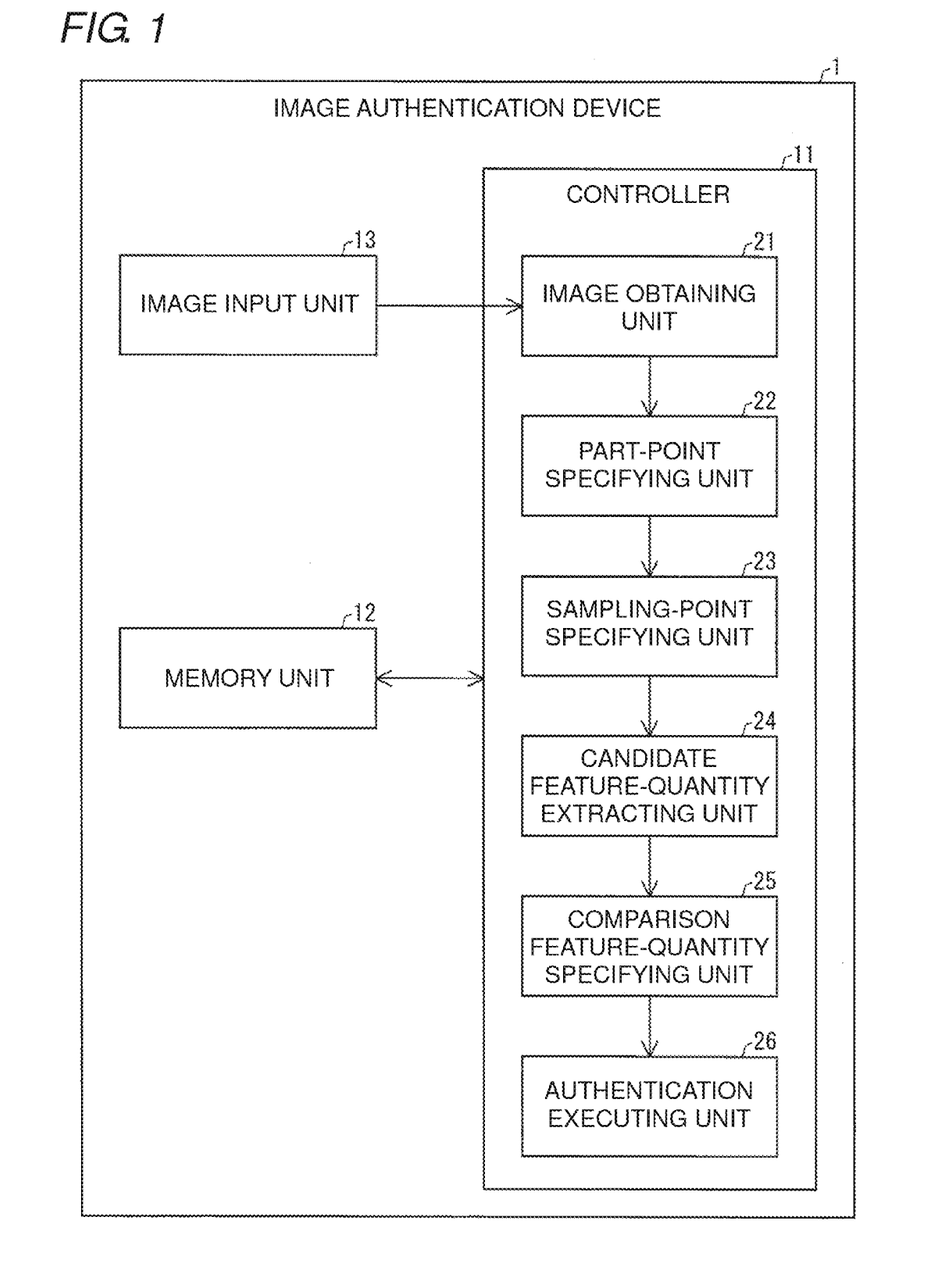
FIG. 1 is a block diagram showing a configuration of an image authentication device according to an embodiment of the present invention.

FIG. 1 is a block diagram showing a configuration of an image authentication device 1. The image authentication device 1 compares feature quantities of a part point of an object on an image between an image registered in advance and an input image, and executes authentication of the object.

The image authentication device 1 may be a PC, a digital camera, a digital video camera, a portable telephone, a smartphone, a PDA (Personal Digital Assistant), a game machine, a device that photographs and prints an image, and a device that edits an image, for example.

In the present embodiment, although a face of a person is assumed as an object to be authenticated, an object to be authenticated is not limited to the face. The object may be any material object on an image, such as a whole body of a person, an animal such as a dog and a cat, a device such as a portable telephone and a television, a structure, and a plant, for example.

In the present embodiment, although an object is authenticated, the present invention may be also used to estimate an attribute or a state of an object. For example, estimation of age, estimation of gender, or estimation of a face expression may be executed, by comparing feature quantities of a part point of an object (a person) on an image between an image registered in advance and an input image. Further, estimation of age, gender, or expression may be executed, by comparing feature quantities of a part point of an object (a person) on an image between a learning result obtained by machine learning in advance and an input image. That is, the present invention can be applied to an arbitrary image processing method including a process of detecting a part point of an object on an image and a process of comparing feature quantities of the detected part point. The present invention can be applied to an arbitrary image processing device that detects a part point of an object on an image and that compares feature quantities of the detected part point.

The part point of an object is a point in a region of the object on an image. Specifically, when the object is a face of a person, the part point is an contour point or a pupil, for example.

The image authentication device 1 includes a controller 11, a memory unit 12, and an image input unit 13, as shown in FIG. 1. The image authentication device 1 may include a component such as an operating unit, a communicating unit, a display unit, a voice input unit, and a voice output unit. However, since the component is not related to features of the invention, the component is not shown in the drawings.

The image input unit 13 is an interface for obtaining an image from external image providing device (not shown). The image providing device may be any device that provides to other device a held image or an obtained image. For example, the image providing device is a storage device such as a digital camera, a digital video camera, a portable telephone, a smartphone, a PDA, a game machine, and a USB (Universal Serial Bus) memory. The image authentication device 1 may be installed with a camera in place of the image input unit 13.

The controller 11 performs various calculations and controls, as a whole, each unit included in the image authentication device 1, by executing a program read from the memory unit 12 into a temporary memory unit (not shown).

In the present embodiment, the controller 11 includes, an image obtaining unit 21, a part-point specifying unit 22, a sampling-point specifying unit 23, a candidate feature-quantity extracting unit (a feature-quantity extracting unit) 24, a comparison feature-quantity specifying unit (a feature-quantity generating unit) 25, and an authentication executing unit 26. These blocks (21 to 27) of the controller 11 can be realized by a CPU (Central Processing Unit) that reads programs stored in a storage device realized by a ROM (Read Only Memory) and the like, into a temporary memory unit realized by a RAM (Random Access Memory) and the like, and executes the programs.

The image obtaining unit 21 obtains a registered image and an input image via the image input unit 13. The image obtaining unit 21 outputs the registered image and the input image that are obtained to the part-point specifying unit 22. When an image is stored in the memory unit 12, the image obtaining unit 21 may read the registered image and the input image from the memory unit 12.

The part-point specifying unit 22 specifies a part point of an object, for each of the registered image and the input image. In the present embodiment, since authentication of an individual person is executed based on a facial image of a person, the part-point specifying unit 22 first detects a face from the image. Then, the part-point specifying unit 22 specifies a part point of the detected face, such as a contour point of outer corners of the eyes, inner corners of the eyes, the pupil, the mouth, the nose, and the ears.

The part-point specifying unit 22 specifies a part point of the same type, from the registered image and the input image. Further, the part-point specifying unit 22 specifies one or a plurality of part points, from each of the registered image and the input image.

A method of specifying a part point of the object from the image may be arbitrary. The part-point specifying unit 22 may specify a predetermined part point by using a conventional detection technique.

Figure 2:
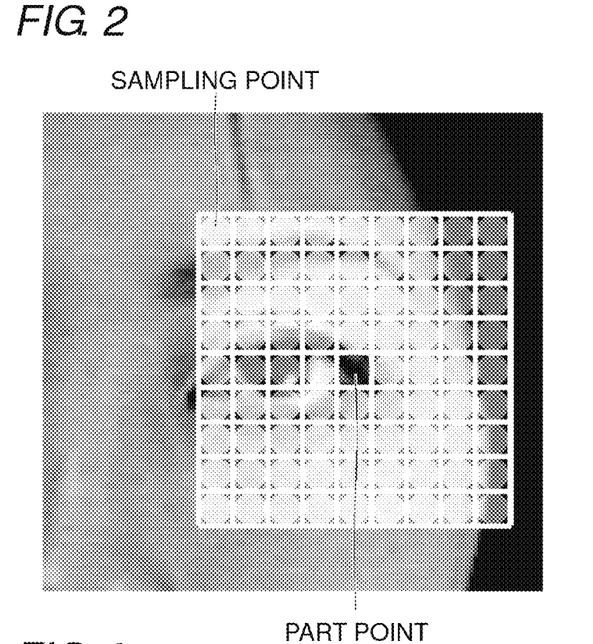
FIG. 2 shows positions of a plurality of sampling points of part points.

The sampling-point specifying unit 23 specifies a plurality of sampling points corresponding to a part point specified by the part-point specifying unit 22, for each of the registered image and the input image. Specifically, the sampling-point specifying unit 23 may specify, as sampling points, positions of pixels contained in a rectangular region centered around a part point specified by the part-point specifying unit 22, as shown in FIG. 2. The sampling-point specifying unit 23 may also specify, as sampling points, positions of pixels contained in a circular region centered around a part point specified by the part-point specifying unit 22.

The sampling-point specifying unit 23 may also specify, as sampling points, positions of all pixels contained in a predetermined region including a part point specified by the part-point specifying unit 22, or may specify, as sampling points, positions of a part of pixels among the pixels in the region.

The sampling-point specifying unit 23 may specify, as sampling points, total nine pixels including a pixel of a part point specified by the part-point specifying unit 22 and pixels separated vertically, horizontally, and diagonally from the pixel of the part point by a predetermined number of pixels. The sampling-point specifying unit 23 may specify, as sampling points, total five pixels including a pixel of a part point specified by the part-point specifying unit 22 and pixels separated vertically and horizontally from the pixel of the part point by N pixels (N is a natural number).

In this way, the sampling-point specifying unit 23 may specify, as sampling points, a part point specified by the part-point specifying unit 22 and at least one point on the image other than the part point, and a method of specifying the sampling points may be arbitrary. However, the sampling-point specifying unit 23 uses the same specifying method to the registered image and the input image, for each part point.

The candidate feature-quantity extracting unit 24 extracts one or a plurality of feature quantities from a pixel of a sampling point or from a pixel group including the pixel, for each of a plurality of sampling points specified by the sampling-point specifying unit 23, and extracts candidate feature quantities (a feature quantity pool) corresponding to the part point constituted by the extracted plurality of feature quantities corresponding to each sampling point.

Figure 3:
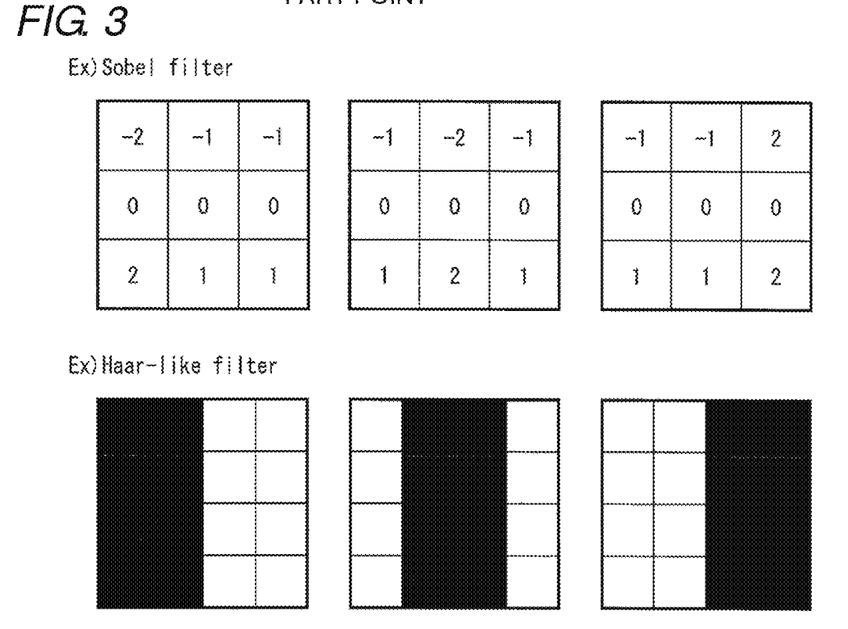
FIG. 3 shows an example of a filter for extracting a feature quantity from a pixel group.

Specifically, the candidate feature-quantity extracting unit 24 calculates a feature quantity by using filters shown in FIG. 3 or the like, for 3×3 pixels or 4×4 pixels centered around a pixel of the sampling point. A feature quantity extracted by the candidate feature-quantity extracting unit 24 is not limited to a Sobel filter and a Haar-like filter shown in FIG. 3, may be arbitrary. For example, the feature quantity may be a luminance value, edge information, a frequency characteristic (Gabor, Haar, or the like), a luminance gradient feature quantity (SIFT, HOG, or the like), or a combination thereof. Further, a shape of the filter is not limited to 3×3 pixels or 4×4 pixels shown in FIG. 3, and may be arbitrary. For example, a shape of the filter may be 2×2 pixels or 5×5 pixels.

The candidate feature-quantity extracting unit 24 may extract one feature quantity for one sampling point, by calculating feature quantities using a type of filter, or may extract a plurality of feature quantities for one sampling point, by calculating feature quantities using a plurality of types of filters. For example, the candidate feature-quantity extracting unit 24 may extract a luminance value and a Haar value as feature quantities, from a pixel or a pixel group of one sampling point. The candidate feature-quantity extracting unit 24 may extract two types of feature quantities, by extracting, as a feature quantity, a luminance value from a pixel group of 3×3 pixels centered around a sampling point, and also by extracting, as a feature quantity, a luminance value from a pixel group of 4×4 pixels centered around the same sampling point.

The candidate feature-quantity extracting unit 24 may extract a feature quantity from only a pixel of a sampling point, or may extract a feature quantity from a pixel group including a pixel of a sampling point and at least one pixel other than the pixel.

In the case of extracting a feature quantity from a pixel group including a pixel of a sampling point, the candidate feature-quantity extracting unit 24 may extract a feature quantity based on an average value or a median value of values of total pixels contained in the pixel group. In this case, the candidate feature-quantity extracting unit 24 may extract a feature quantity based on one or a plurality of pixels contained in the pixel group. For example, in the case of extracting a feature quantity from a pixel group including nine pixels of 3×3 pixels centered around a sampling point, the candidate feature-quantity extracting unit 24 may extract a feature quantity based on an average value or a median value of values of the nine pixels. The candidate feature-quantity extracting unit 24 may extract a feature quantity based on one or a plurality of pixels among the nine pixels.

In this way, a feature-quantity extracting method executed by the candidate feature-quantity extracting unit 24 may be arbitrary. However, the candidate feature-quantity extracting unit 24 uses the same feature-quantity extracting method to the registered image and the input image, for each part point.

The comparison feature-quantity specifying unit 25 specifies a comparison feature quantity for judging whether the registered image and the input image match or are similar to each other, from the candidate feature quantities extracted by the candidate feature-quantity extracting unit 24, for each part point. The comparison feature-quantity specifying unit 25 specifies one or a plurality of comparison feature quantities for one part point. That is, the comparison feature-quantity specifying unit 25 can be said to be a feature-quantity generating unit that generates one or a plurality of the comparison feature quantities corresponding to the part point, based on a predetermined standard by using candidate feature quantities extracted by the candidate feature-quantity extracting unit 24.

Specifically, the comparison feature-quantity specifying unit 25 may select one or a plurality of the comparison feature quantities of the part point, based on a predetermined standard, from the candidate feature quantities extracted by the candidate feature-quantity extracting unit 24. For example, the comparison feature-quantity specifying unit 25 may select, as a comparison feature quantity, a feature quantity having a maximum value, a minimum value, or a median value from the candidate feature quantities. The comparison feature-quantity specifying unit 25 may select, as a comparison feature quantity, three largest feature quantities in descending order or three smallest feature quantities in ascending order from the candidate feature quantities. The comparison feature-quantity specifying unit 25 may select, as a comparison feature quantity, a feature quantity having a maximum value, a minimum value, or a median value of an absolute value from the candidate feature quantities. The comparison feature-quantity specifying unit 25 may invert positive and negative values of feature quantities of candidate feature quantities, and select, as a comparison feature quantity, a feature quantity having a maximum value, a minimum value, or a median value from the positive-and-negative inverted candidate feature quantities. The comparison feature-quantity specifying unit 25 may categorize candidate feature quantities into positive and negative values, and select a feature quantity having a maximum value, a minimum value, or a median value of the positive values or a maximum value, a minimum value, or a median value of the negative values as a comparison feature quantity.

The comparison feature-quantity specifying unit 25 may calculate one or a plurality of the comparison feature quantities by using the candidate feature quantities extracted by the candidate feature-quantity extracting unit 24. For example, the comparison feature-quantity specifying unit 25 may calculate an average value or an average value of N-th power of candidate feature quantities, as a comparison feature quantity. The comparison feature-quantity specifying unit 25 may calculate an average value or an average value of N-th power of absolute values of candidate feature quantities, as a comparison feature quantity. The comparison feature-quantity specifying unit 25 may invert positive and negative values of feature quantities of candidate feature quantities, and calculate an average value or an average value of N-th power of the inverted candidate feature quantities, as a comparison feature quantity. The comparison feature-quantity specifying unit 25 may categorize feature quantities of candidate feature quantities into positive and negative values, and calculate a average value or a average value of N-th power of the positive values or a average value or a average value of N-th power of the negative values as a comparison feature quantity.

An array of one or a plurality of feature quantities that the comparison feature-quantity specifying unit 25 specifies as a comparison feature quantity for each of one or a plurality of part points is referred to as a feature-quantity vector (a first vector). That is, the feature-quantity vector is an array of feature quantities selected or calculated from candidate feature quantities for each part point. For example, when the comparison feature-quantity specifying unit 25 specifies three comparison feature quantities for each of ten part points, the feature-quantity vector is a first-order vector of 30 dimensions.

The comparison feature-quantity specifying unit 25 may set, as a comparison feature quantity, a conversion vector (a second vector) obtained by converting the feature-quantity vector based on a predetermined standard. For example, the comparison feature-quantity specifying unit 25 may use, as a conversion vector, a vector obtained by expanding or compressing a dimension of a feature-quantity vector. More specifically, the comparison feature-quantity specifying unit 25 may generate a five-dimensional vector from a 30-dimensional comparison feature quantity, and use this vector as a comparison feature quantity.

The authentication executing unit 26 compares between a comparison feature quantity of a registered image and a comparison feature quantity of an input image, and executes authentication, for each part point. A method of authenticating an individual person or an object based on a feature quantity of a part point may be arbitrary.

Figure 4:
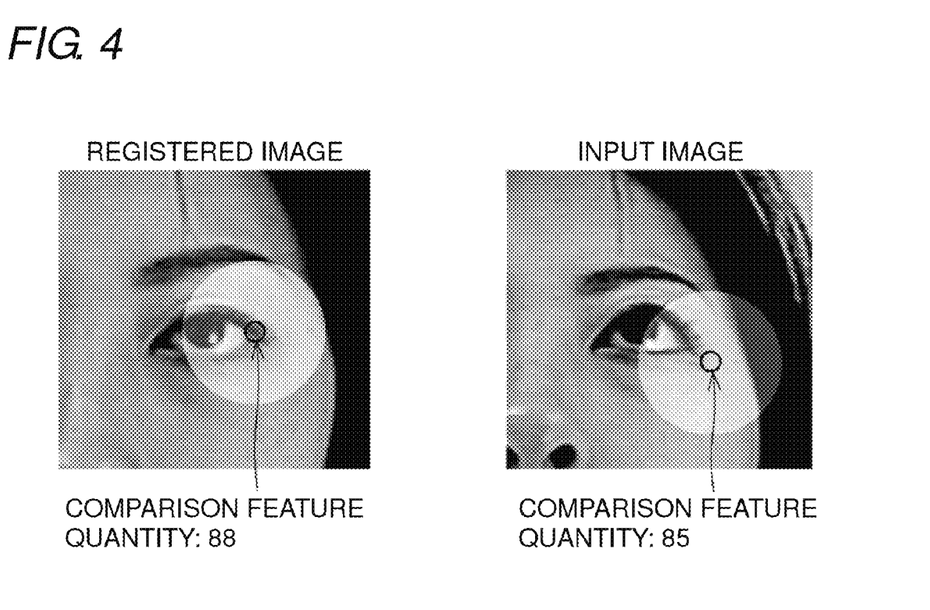
FIG. 4 shows an example of comparison feature quantities of a certain part point in a registered image and in an input image.

For example, as shown in FIG. 4, when a difference between a comparison feature quantity of a registered image and a comparison feature quantity of an input image is equal to or less than a predetermined value, the authentication executing unit 26 may decide that features of the part point match or are similar to each other. In a case where there is a plurality of comparison feature quantities for one part point, it may be decided that features of the part point match or are similar to each other when all differences of the comparison feature quantities are equal to or less than a predetermined value, or it may be decided that features of the part point match or are similar to each other when there is a predetermined number or a number more than the predetermined number of comparison-feature quantity differences that are equal to or less than a predetermined value. In a case where there is a plurality of part points of an object, the authentication executing unit 26 may decide that a person in the registered image and a person in the input image are the same person when the authentication executing unit 26 decides that features of all part points match or are similar to each other, or the authentication executing unit 26 may decide that a person in the registered image and a person in the input image are the same person when the authentication executing unit 26 decides that features of part points match or are similar to each other for a predetermined number of part points or a number more than the predetermined number.

The authentication executing unit 26 may calculate, as similarity, a distance (for example, a Euclidean distance or a Mahalanobis distance) between the feature-quantity vectors or conversion vectors, and decide whether features of the part points match or are similar to each other based on the calculated similarity. The authentication executing unit 26 may calculate, as similarity, an inner product of the feature-quantity vector or conversion vector, and decide whether features of the part points match or are similar to each other based on the calculated similarity.

The comparison feature quantity of the registered image may be a feature quantity extracted from a pixel or a pixel group of a part point, in a similar manner to the conventional practice.

Instead of specifying a comparison feature quantity of a registered image for each authentication, a comparison feature quantity of a registered image may be specified in advance before the authentication, and the comparison feature quantity of the registered image may be stored in the memory unit 12. In this case, the authentication executing unit 26 executes the authentication by reading the comparison feature quantity of the registered image from the memory unit 12.

The memory unit 12 stores programs and data to be referred to by the controller 11, and stores, for example, the registered image, the comparison feature quantity of the registered image, a part point specifying method, a sampling point specifying method, a feature-quantity extracting method, and a comparison feature quantity specifying method.

[Authentication Process that Image Authentication Device Executes]

Figure 5:
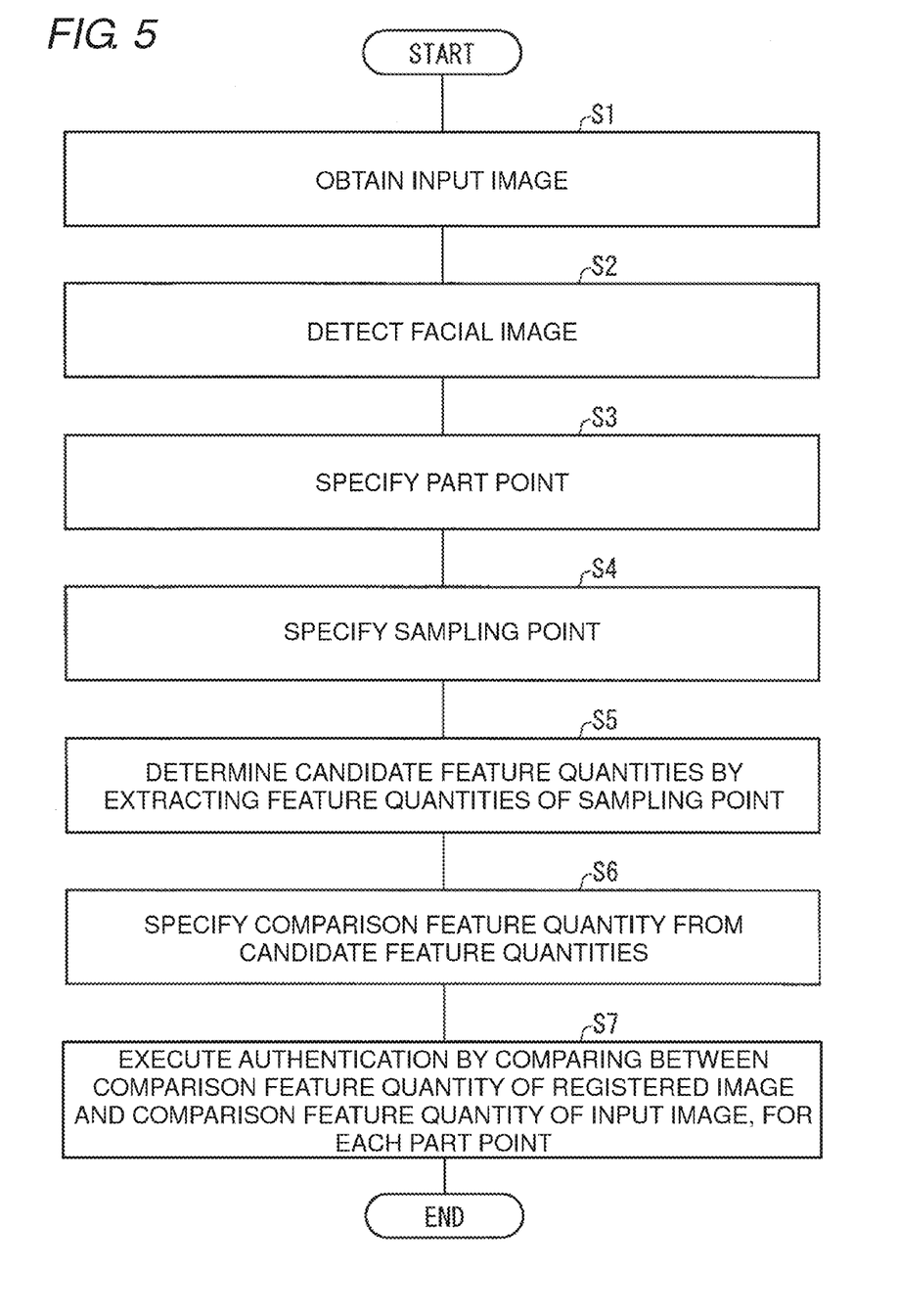
FIG. 5 is a flowchart showing a flow of an authentication process that the image authentication device executes.

Next, an authentication process that the image authentication device 1 executes is described with reference to FIG. 5. FIG. 5 is a flowchart showing a flow of the authentication process that the image authentication device 1 executes.

As shown in FIG. 5, first, the image obtaining unit 21 obtains a registered image and an input image via the image input unit 13 (S1). Next, the part-point specifying unit 22 detects a face from each of the registered image and the input image (S2). Then, the part-point specifying unit 22 specifies a part point of the detected face, such as a contour point of outer corners of the eyes, inner corners of the eyes, the pupil, the mouth, the nose, and the ears, for each of the registered image and the input image (S3).

The sampling-point specifying unit 23 specifies a plurality of sampling points of the part point specified by the part-point specifying unit 22, for each of the registered image and the input image (S4). The candidate feature-quantity extracting unit 24 extracts one or a plurality of feature quantities from a pixel of a sampling point or from a pixel group including the pixel, for each of a plurality of sampling points specified by the sampling-point specifying unit 23, and extracts candidate feature quantities corresponding to the part point (S5). The comparison feature-quantity specifying unit 25 specifies a comparison feature quantity from the candidate feature quantities extracted by the candidate feature-quantity extracting unit 24, for each part point (S6).

The authentication executing unit 26 executes the authentication, by comparing between the comparison feature quantity of the registered image and the comparison feature quantity of the input image, for each part point (S7).

[Example of Realization by Software]

A control block (particularly, the controller 11) of the image authentication device 1 may be realized by a logic circuit (hardware) formed by an integrated circuit (an IC chip), or may be realized by software using the CPU (Central Processing Unit).

In the latter case, the image authentication device 1 includes the CPU that executes instructions of programs as software for realizing each unit, a ROM (Read Only Memory) or a storage device (these are referred to as "recording mediums") in which the programs and various data are recorded so that a computer (or the CPU) can read the programs and various data, and a RAM (Random Access Memory) that develops the programs. The object of the present invention is achieved by the computer (or the CPU) that reads the programs from the recording mediums and executes the programs. For the recording mediums, there can be used a "tangible medium not temporary" such as a tape, a disc, a card, a semiconductor memory, and a programmable logic circuit. The programs may be supplied to the computer via an arbitrary transmission medium (a communication network, a broadcasting wave, etc.) that can transmit the programs. The present invention can be also realized in a mode of a data signal embedded in a carrier wave, by which the programs are realized by electronic transmission.

[Summary]

An image processing device according to at least one embodiment of the present invention is an image processing device that compares comparison feature quantities of a part point of an object on an image, between a registered image and an input image, and executes authentication of the object or executes estimate of an attribute or a state of the object. The image processing device comprises a part-point specifying unit that specifies a part point of the object, a feature-quantity extracting unit that extracts one or a plurality of feature quantities from a pixel of a sampling point or from a pixel group including the pixel of the sampling point, for each of a plurality of sampling points, and extracts candidate feature quantities corresponding to the part point constituted by the extracted plurality of feature quantities corresponding to the respective sampling points, the plurality of sampling points comprising the part point specified by the part-point specifying unit and at least one point on the image other than the part point, and a feature-quantity generating unit that generates one or a plurality of comparison feature quantities corresponding to the part point based on a predetermined standard by using the candidate feature quantities extracted by the feature-quantity extracting unit.

According to the above configuration, the feature-quantity extracting unit extracts feature quantities from a part point and at least one point on the image other than the part point, and uses the extracted feature quantities as candidate feature quantities. Then, the feature-quantity generating unit generates a comparison feature quantity from the candidate feature quantities. Accordingly, there is an effect that even when a part point specified is deviated from a correct position, a stable value can be generated as a comparison feature quantity, without a large variation of the comparison feature quantity of the part point. Accordingly, there is an effect that even when a part point specified is deviated from a correct position, precise authentication can be stably executed.

According to an image processing device of at least one embodiment of the present invention, the feature-quantity generating unit may select one or a plurality of the comparison feature quantities of the part point, based on a predetermined standard, from the candidate feature quantities extracted by the feature-quantity extracting unit.

According to the above configuration, the feature-quantity generating unit selects any of the candidate feature quantities as the comparison feature quantity. Therefore, a comparison feature quantity can be generated by an easy process.

According to an image processing device of at least one embodiment of the present invention, the feature-quantity generating unit may calculate one or a plurality of the comparison feature quantities corresponding to the part point, using candidate feature quantities extracted by the feature-quantity extracting unit.

According to an image processing device of at least one embodiment of the present invention, the part-point specifying unit may specify a plurality of part points, and the feature-quantity generating unit may generate a feature-quantity vector obtained by arraying one or a plurality of feature quantities specified by using the candidate feature quantities for the plurality of part points, and generate, as a comparison feature quantity, a conversion vector obtained by converting a generated feature-quantity vector.

An image processing method according to at least one embodiment of the present invention is an image processing method for comparing comparison feature quantities of a part point of an object on an image between a registered image and an input image, and executing authentication of the object or executing estimate of an attribute or a state of the object. The image processing method comprises a part-point specifying step of specifying a part point of the object, a feature-quantity extracting step of extracting one or a plurality of feature quantities from a pixel of a sampling point or from a pixel group including the pixel of the sampling point, for each of a plurality of sampling points, and extracting candidate feature quantities corresponding to the part point constituted by the extracted plurality of feature quantities corresponding to the respective sampling points, the plurality of sampling points comprising the part point specified by the part-point specifying unit and at least one point on the image other than the part point, and a feature-quantity generating step of generating one or a plurality of comparison feature quantities corresponding to the part point based on a predetermined standard by using the candidate feature quantities extracted in the feature-quantity extracting step.

The image processing device according to at least one embodiment of the present invention may be realized by a computer. In this case, a control program of the image processing device for making the computer realize the image processing device by operating the computer as each unit included in the image processing device, and a non-transitory computer-readable recording medium in which the control program of the image processing device is recorded are also included within the scope of the present invention.

The present invention is not limited to the embodiment described above, and can be variously modified within the scope described in claims. That is, an embodiment obtained by combining technical units suitably modified within the scope of claims is also included in the technical scope of the present invention.

INDUSTRIAL APPLICABILITY

The present invention can be used for an image authentication device that authenticates a person, an object, and the like by using an image.

The invention claimed is:

1. An image processing device for comparing comparison feature quantities of a part point of an object on an image between a registered image and an input image, and executing authentication of the object or executing estimate of an attribute or a state of the object, the image processing device comprising:
    a storage device configured to store program codes; and
    a processing unit configured to execute the program codes to operate:
        a part-point specifying unit configured to specify a part point of the object;
        a feature-quantity extracting unit configured to extract one or a plurality of feature quantities from a pixel of a sampling point or from a pixel group including the pixel of the sampling point, for each of a plurality of sampling points, and extract candidate feature quantities corresponding to the part point constituted by the extracted plurality of feature quantities corresponding to the respective sampling points, the plurality of sampling points comprising the part point specified by the part-point specifying unit and at least one point on the image other than the part point; and
        a feature-quantity generating unit configured to generate one or a plurality of comparison feature quantities corresponding to the part point based on a predetermined standard by using the candidate feature quantities extracted by the feature-quantity extracting unit;
    wherein the predetermined standard includes inverted positive and negative values of feature quantities of the candidate feature quantities.

2. The image processing device according to claim 1, wherein the feature-quantity generating unit selects one or a plurality of the comparison feature quantities corresponding to the part point, based on a predetermined standard, from the candidate feature quantities extracted by the feature-quantity extracting unit.

3. The image processing device according to claim 1, wherein the feature-quantity generating unit calculates one or a plurality of the comparison feature quantities corresponding to the part point by using candidate feature quantities extracted by the feature-quantity extracting unit.

4. The image processing device according to claim 1, wherein
the part-point specifying unit specifies a plurality of part points, and
the feature-quantity generating unit generates a feature-quantity vector obtained by arraying one or a plurality of feature quantities specified by using the candidate feature quantities for the plurality of part points, and generates, as a comparison feature quantity, a conversion vector obtained by converting the generated feature-quantity vector.

5. The image processing device according to claim 2, wherein
the part-point specifying unit specifies a plurality of part points, and
the feature-quantity generating unit generates a feature-quantity vector obtained by arraying one or a plurality of feature quantities specified by using the candidate feature quantities for the plurality of part points, and generates, as a comparison feature quantity, a conversion vector obtained by converting the generated feature-quantity vector.

6. The image processing device according to claim 3, wherein
the part-point specifying unit specifies a plurality of part points, and
the feature-quantity generating unit generates a feature-quantity vector obtained by arraying one or a plurality of feature quantities specified by using the candidate feature quantities for the plurality of part points, and generates, as a comparison feature quantity, a conversion vector obtained by converting the generated feature-quantity vector.

7. An image processing method for comparing comparison feature quantities of a part point of an object on an image between a registered image and an input image, and executing authentication of the object or executing estimate of an attribute or a state of the object, the image processing method comprising:
specifying a part point of the object;
extracting one or a plurality of feature quantities from a pixel of a sampling point or from a pixel group including the pixel of the sampling point, for each of a plurality of sampling points, and extracting candidate feature quantities corresponding to the part point constituted by the extracted plurality of feature quantities corresponding to the respective sampling points, the plurality of sampling points comprising the part point specified by the part-point specifying unit and at least one point on the image other than the part point; and
generating one or a plurality of comparison feature quantities corresponding to the part point, based on a predetermined standard, by using the candidate feature quantities extracted in the feature-quantity extracting step;
wherein the predetermined standard includes inverted positive and negative values of feature quantities of the candidate feature quantities.

8. A non-transitory recording medium storing a control program, the control program being configured to make a computer carry out the image processing method of claim 7.

* * * * *